Jan. 26, 1960 J. E. HATFIELD 2,922,604
PARACHUTE PACK CONSTRUCTION
Filed July 27, 1956 5 Sheets-Sheet 1
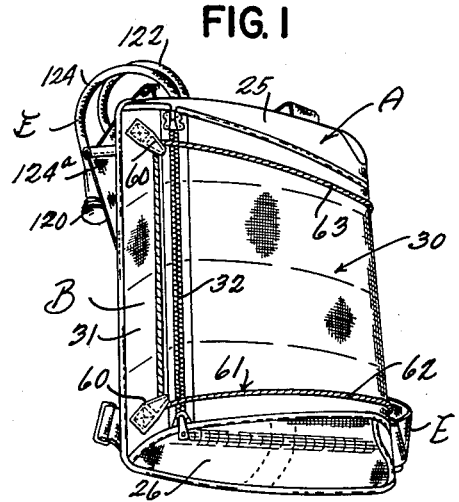
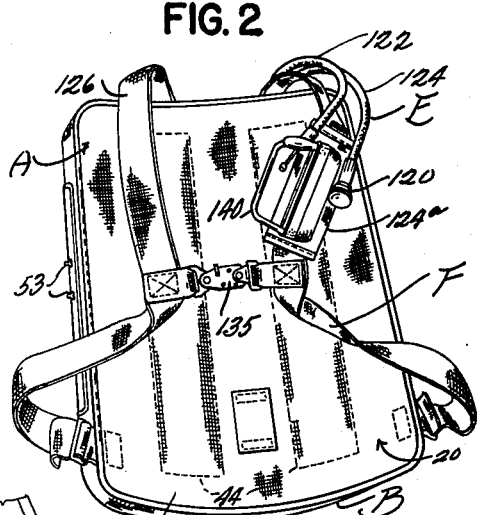
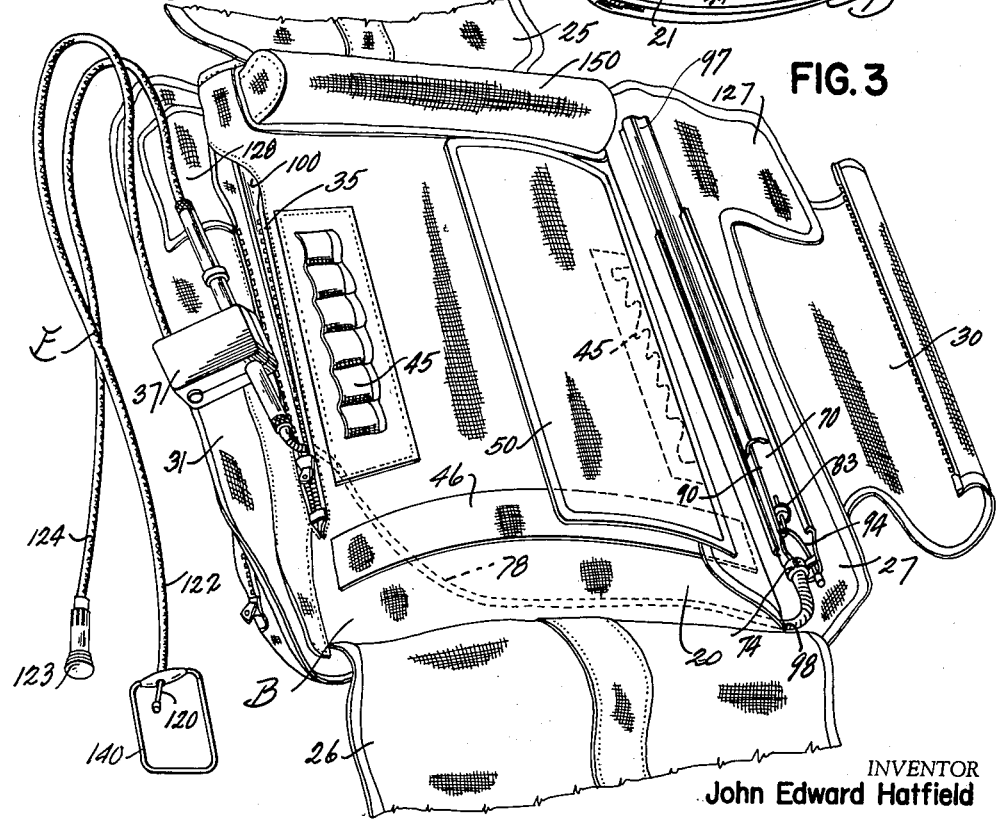
INVENTOR
John Edward Hatfield
BY
ATTORNEYS

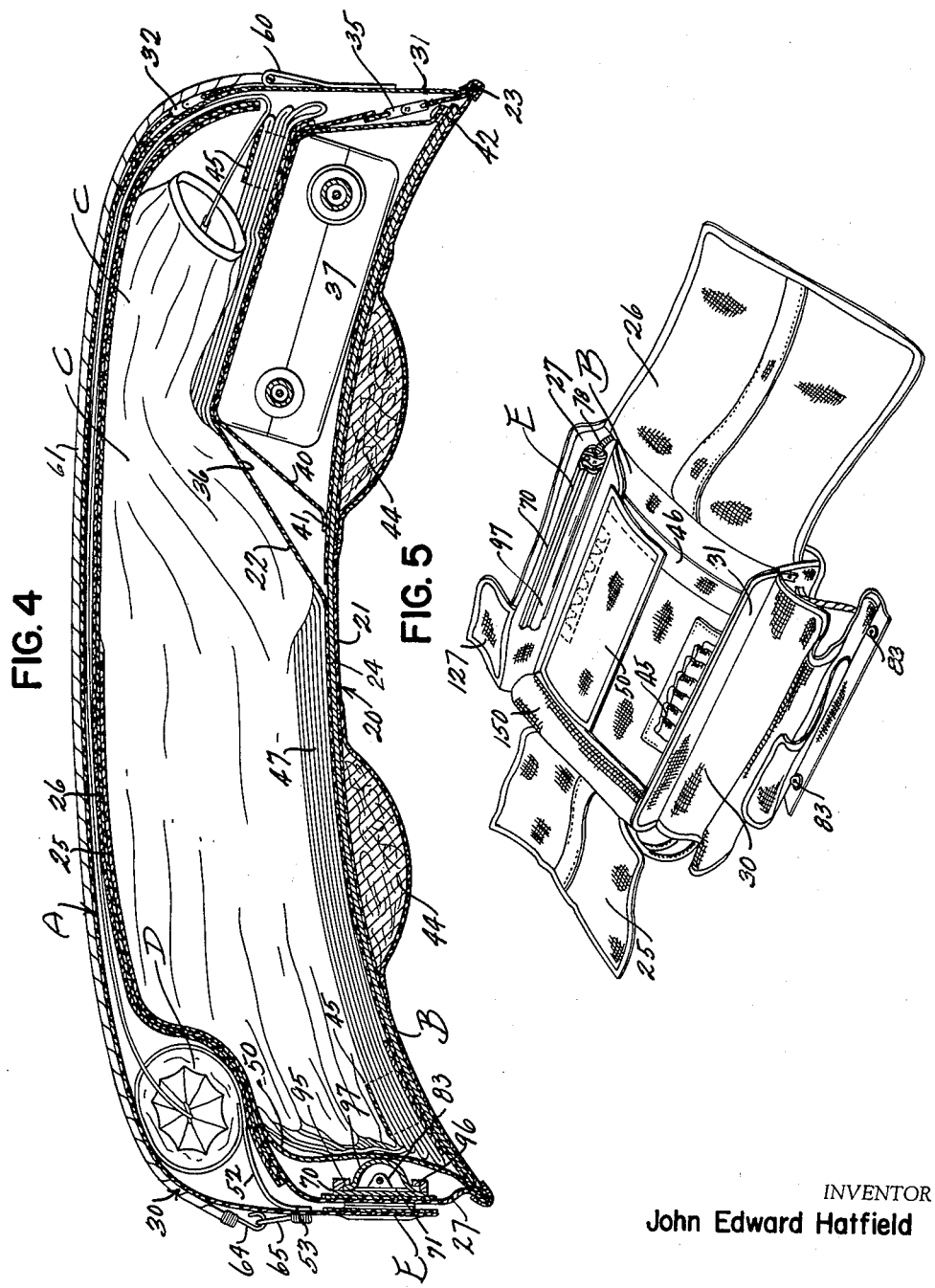

Jan. 26, 1960  J. E. HATFIELD  2,922,604
PARACHUTE PACK CONSTRUCTION
Filed July 27, 1956  5 Sheets-Sheet 3

INVENTOR
John Edward Hatfield
BY *Lancaster, Allwine Rommel*
ATTORNEYS

Jan. 26, 1960   J. E. HATFIELD   2,922,604
PARACHUTE PACK CONSTRUCTION
Filed July 27, 1956   5 Sheets-Sheet 4
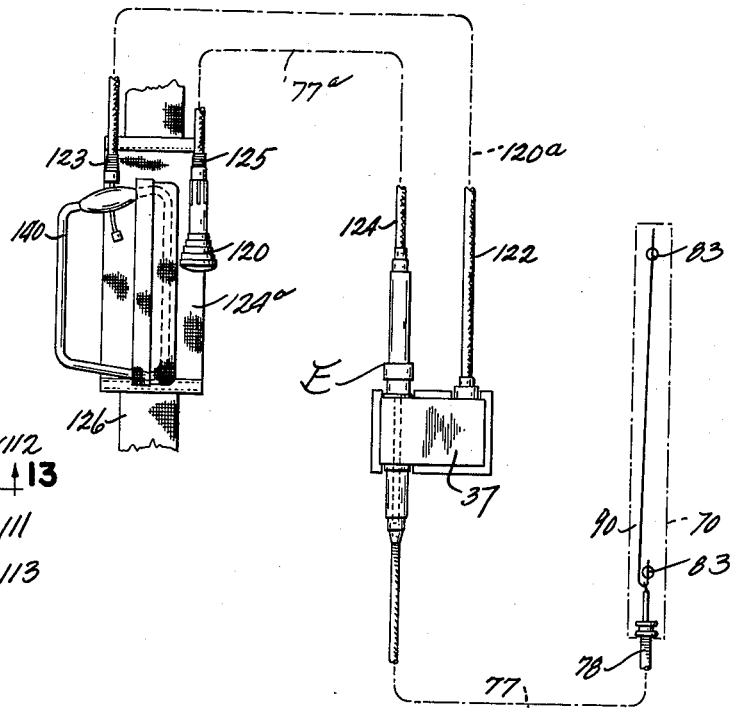
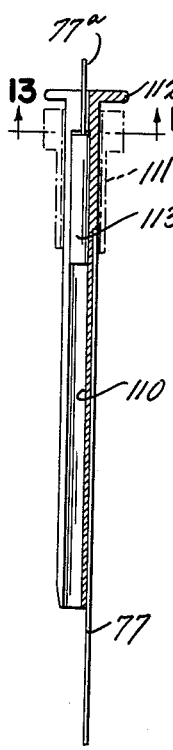
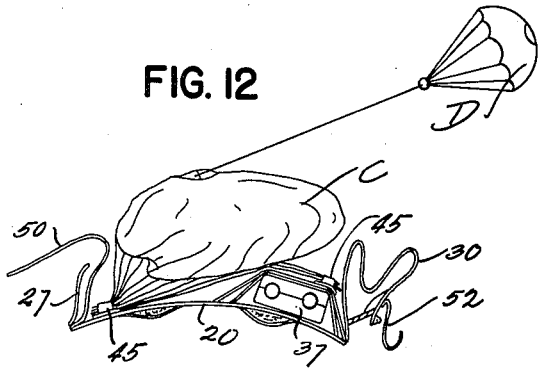
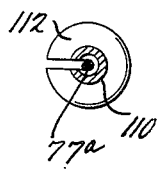
INVENTOR
John Edward Hatfield
BY
ATTORNEYS Jan. 26, 1960 J. E. HATFIELD 2,922,604
PARACHUTE PACK CONSTRUCTION
Filed July 27, 1956 5 Sheets-Sheet 5
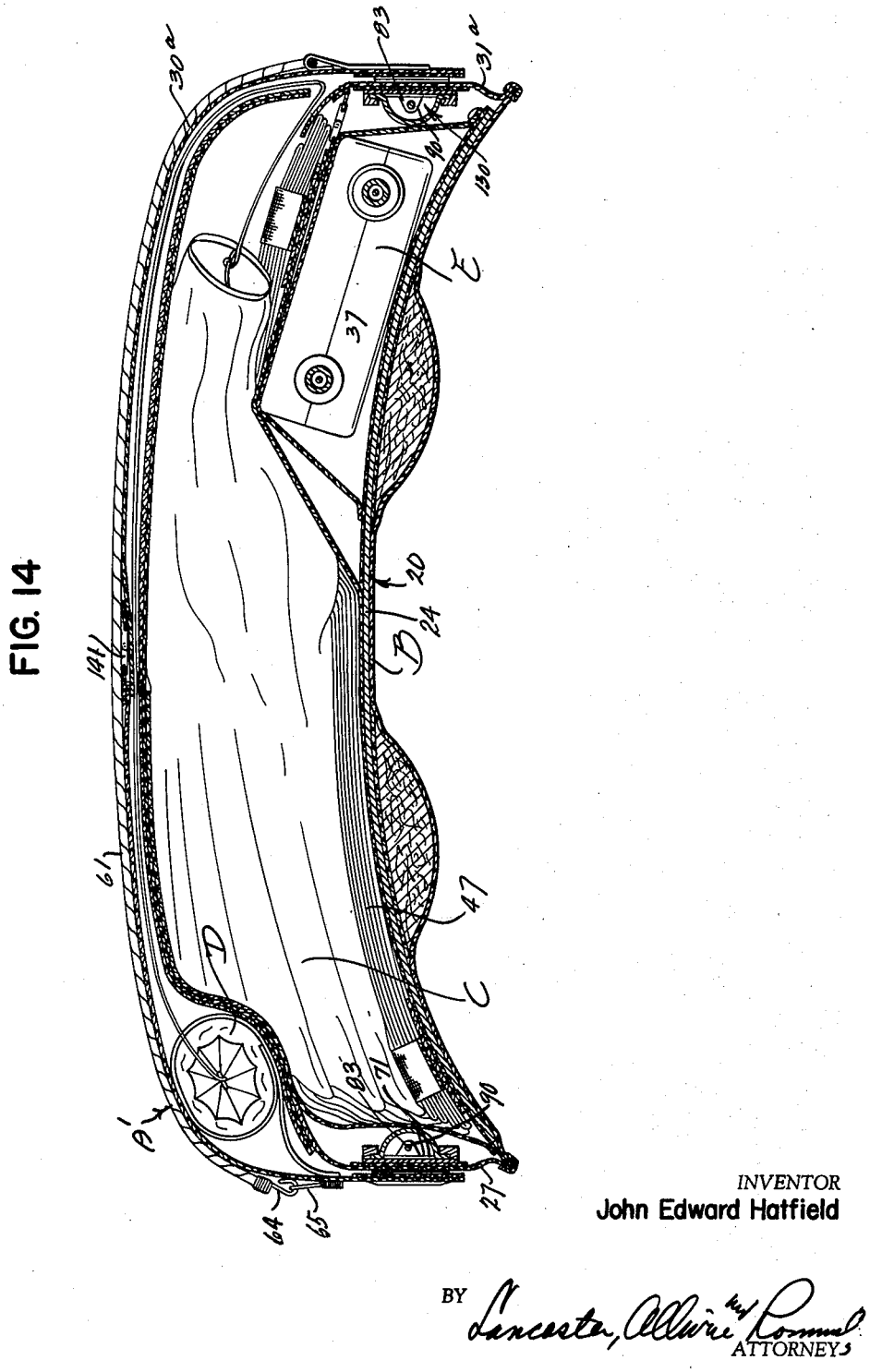
INVENTOR
John Edward Hatfield ' # United States Patent Office 2,922,604
Patented Jan. 26, 1960

2,922,604

PARACHUTE PACK CONSTRUCTION

John E. Hatfield, Stotfold, England, assignor to Irving Air Chute Co., Inc., Lexington, Ky., a corporation of New York Application July 27, 1956, Serial No. 600,477

Claims priority, application Great Britain August 26, 1955

13 Claims. (Cl. 244—148)

This invention relates to improvements in parachute equipment and particularly to an improved parachute pack construction wherein the details of the pack and its release mechanism are compactly and efficiently arranged for maximum safety.

Because of greatly increased speeds of aircraft and restricted pilot space conditions it is desirable to compact structural features of parachute packs, including the release mechanism thereof, and to house as many of the operating parts within the container as possible in order that they cannot be disturbed by contact with parts of the aircraft.

It is a primary object of this invention to provide a parachute pack, the container of which is so arranged as to provide for the use of a principal flap secured by a release mechanism along a side of the pack so that upon pulling of the rip cord the entire face area of the container will be exposed for quick and safe release of the canopy details.

It is a further object of the present invention to provide for an improved rip cord release mechanism located entirely within the pack, including details such as the rip cord, barometric releases, etc.; just sufficient operating details, such as handles remaining exposed upon the pack for manual or other release operation.

A further object of this invention is the provision of a pack, the container of which is so formed as to provide for a principal flap upon which the folded pilot parachute may be mounted, under such conditions that when the principal flap is opened the pilot parachute will be thrown clear from objectionable interference by other pack details.

A further object of this invention is the provision of an improved parachute pack container the release mechanism of which presents a novel departure from accepted practice in that it is located upon a rigid base and suitably housed so as to protect the details thereof, including rid cord connections, and under such conditions that the complete rip cord release details are enclosed within the pack and not exposed externally upon the container.

Other objects and advantages of this invention will be apparent during the course of the following detailed description.

In the accompanying drawings forming a part of this specification and wherein similar reference characters designate corresponding parts throughout the several views:

Figure 1 is a front perspective view of the enclosed parachute pack, at the principal flap side thereof.

Figure 2 is a rear perspective view of the closed body attaching side of the pack.

Figure 3 is a perspective view of the opened container of the pack showing the associated features of the fastener release mechanism and container. This view shows the fastener pin guard hood partly opened.

Figure 4 is a transverse enlarged cross sectional view of the closed pack showing the internal details thereof including main and pilot parachutes and a principal flap and its fastener mechanism.

Figure 5 is a perspective view of the parachute pack container with the flaps thereof in opened relation.

Figure 10 is a somewhat diagrammatic view showing the layout of the rip cord fastener releasing mechanism.

Figure 11 is a lengthwise sectional view taken through a detail of the barometric release mechanism, which under influence of other conventional details (not shown) operates the rip cord for releasing the fastener safety pins.

Figure 12 is a diagrammatic view illustrating the unfurling and emergence of the details of the parachute canopies from the opened pack.

Figure 13 is a transverse cross sectional view taken substantially on the line 13—13 of Figure 11.

Figure 14 is a transverse cross sectional view taken through a closed pack, having modified details of construction; the view being similar to that of Figure 4.

Figure 6:
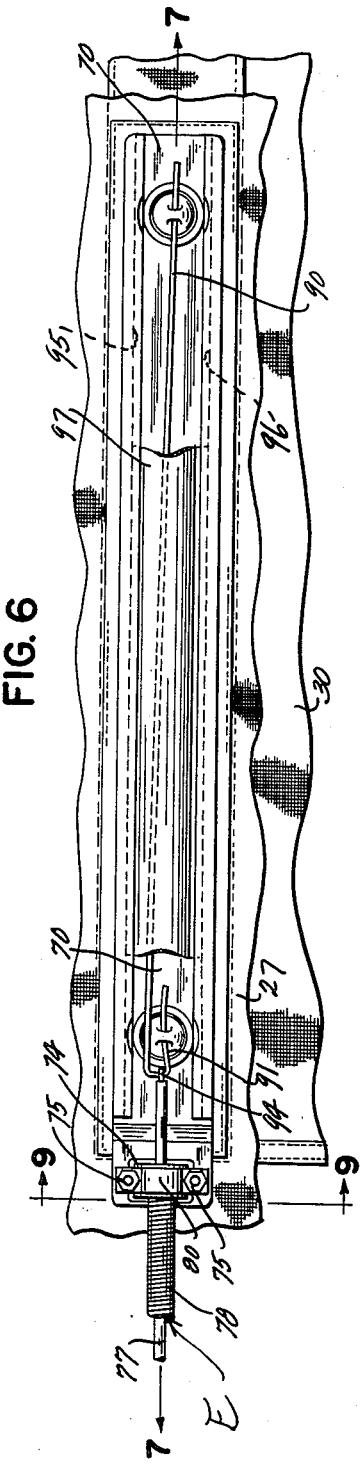
Figure 6 is a front elevational view of the pack container fastener mechanism showing the details thereof in pack locking position.

In the drawings wherein for the purpose of illustration are shown different forms of invention, the letter A may generally designate the improved parachute pack. It may include a container construction B; main canopy C; pilot canopy D; fastener and release mechanism E, and wearer's harness F.

Referring to the container B, the same may be made of the usual flexible woven material including a back, base or foundation wall 20 which generally consists of an outermost panel section 21 and an innermost panel section 22 bound together and to the adjoining marginal edges of side flaps by means of stitched edge binding 23. The shape of the pack may vary, depending upon the type of pack, whether seat, chest or back. In the example shown the pack is a back type. Between the panels 21 and 22 may be disposed a form shaping rather rigid wall 24 of plastic, cardboard, plywood or other material. The shape conforms to the curvature of the back of a wearer and in this respect it may be semi-flexible if found desirable. A top flexible flap 25 is secured by the binding 23 to the top edge of the back wall 20 and a lower flap 26 may likewise be secured to the lower edge of the wall 20. At the right side of the container is disposed a short flap 27, secured by the binding 23 to the back wall 20. It is upon this flap 27 that the locking pin construction of the fastener means is located for the securement of the principal cover flap 30 thereto. At the opposite side of the pack there is disposed a short flap 31 to which the principal flap 30 may be detachably connected by a slide type separable fastener 32. Various other types of canopy and corner flaps are provided as will be subsequently mentioned.

The inside panel 22 of the container back wall 20 may have a lengthwise extending slide type fastener 35 therealong, adjacent to the flap 31, whereby access may be had to a chamber 36 in the back wall 20 wherein is adapted to be received a barometric type release mechanism 37 and its connecting flexible rip cord cable housings as will be subsequently described.

Figure 3 of the drawings shows the slide fastener 35 opened and the barometric release exposed, lying outside of the chamber 36. If desired an auxiliary cover or flap 40 may be provided upon the wall 20, secured at 41 thereto at one end and having a snap fastener or other means 42 at the opposite end in order to confine the barometric release box against movement within the chamber 36.

Suitable padding 44 may be provided upon the back wall of the pack.

The inside flap 22 of the wall 20 of the pack may be provided with shroud line pockets 45, and a canopy retaining elastic band 46 may be provided transversely upon the panel 22, in the position shown in Figure 5.

The shroud lines 47 of the main canopy C are zigzagged back and forth between the pockets 45 in usual manner and the main canopy C may be folded in usual manner upon the inside of the back wall 20.

A short flap 50 is secured to the inside of the wall 20 for separating fastener pin and release mechanisms from the canopy and shroud lines (see Figure 4). The principal flap 30 is provided with a short flexible flap 52, secured at 53 thereto upon the inside thereof for releasable encirclement therein of the pilot parachute D. As the principal flap is thrown open it will forcefully throw and unfurl the flap 52 for ejection of the pilot parachute D, as can well be understood.

The means for collapsing the principal closure or flap 30, upon actuation of the release mechanism, may comprise any elastic or spring means. By way of example elastic band receiving tabs or members 60 are sewn or otherwise secured upon the outer surface of the side flap 31, through which an elastic band or cord 61 such as generally used in connection with parachute pack container flap opening, is threaded. The ends 62 and 63 of the band 61 are provided with hooks 64 for releasable connection with eyes 65 secured upon the external surface of the principal flap 30 adjacent to the fastener mechanism, as shown in Figure 4. The elastic band 61 is under considerable tension when the pack is closed, and upon actuation of the release mechanism it will pull the flap 30 into collapsed position toward the opposite side of the pack, for full opening of the container and forceful ejection of the pilot parachute.

Referring to the pack container fastener and release mechanism E, the fastener mechanism is mounted upon the short side flap 27, as shown in Figures 4 and 5, and the details thereof are shown in Figures 6 to 9 inclusive. The fastener construction preferably comprises an elongated rigid plate 70 which at its ends is connected by grommets or metal eyelets 71 upon the flap 27. An end 73 thereof may be offset for the connection thereto of a spool 74 which may be secured by a strap 80 bolted or riveted at 75 thereto for the connection thereon of the rip cord flexible guard housing 78 wherein is housed the rip cord 77.

Figure 7:
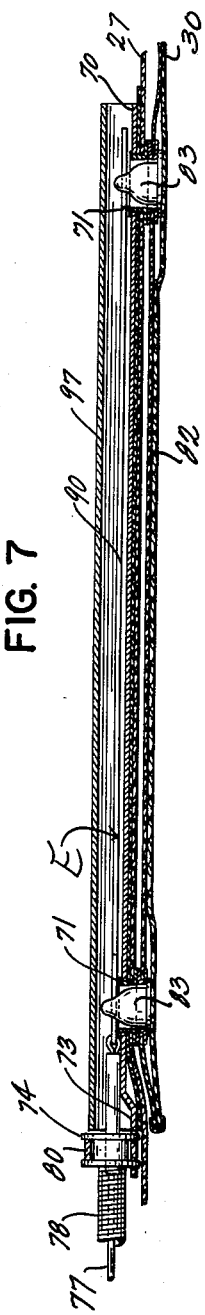
Figure 7 is a longitudinal sectional view of the fastener mechanism taken substantially on the line 7—7 of Figure 6.
Figure 8:
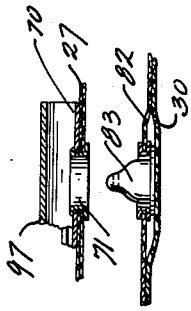
Figure 8 is a detailed view showing a grommet and cone of separable parts of the container, in freed positions.
Figure 9:
Figure 9 is a section of a detail taken substantially on the line 9—9 of Figure 6.

The principal flap 30, at its releasable end is provided with re-enforcement 82, which may be rigid or not, as desired, to which cones or studs 83 are riveted, in usual manner. The spacing of the cones 83 is complementary to that of the eyelets 71 and the cones 83 are slipped into the passageways of the eyelets and project to the inside of the container. The cones 83 at their peak ends are transversely apertured for receiving the fastener locking pin 90, one end of which may pass through one stud and the other end of which may be hooked at 91 and releasably secured in the passageway of the other cone. The rip cord 77 may have a looped connection at 94 with the hook end 91, as shown in Figures 6 and 7.

The supporting plate 70 is provided with facing channel grooves 95 and 96, along the longitudinal margins thereof, laterally of the grommets, for receiving the flanged edges of a guard hood 97. The latter is of rigid material and slides in the grooves 95 and 96 as shown in the cross sectional view of Figure 4. This rigid hood protects the locking pin features of the release mechanism, as is quite obvious.

It has been above mentioned that a primary object of this invention is the placing of most of the fastener and release mechanism within the confines of the pack, in order to avoid interference therewith. To that end the rip cord and its housing 78 extend from the end of the grommet carrying bar 70 along the inside of the lower part of the flap 27, and thence through a small opening (not shown) on the inside panel 22 of the wall 20, at the location 98 shown in Figure 3. The rip cord and housing 78 continue across the chamber 36 between the panels 21 and 22 to the opposite side of the pack (see dotted lines in Figure 3), and thence upwardly within the chamber 36 and exits at an opening 100, shown in Figure 3. The barometric release mechanism 37 is located in the chamber 36 and is readily accessible through a slit or opening which is closed by the slide fastener 35, shown in opened condition in Figure 3, and in closed condition in Figure 4.

The barometric release box 37 may partake of the construction shown in U.S. Patent 2,676,655. The barometric release mechanism need not be further detailed than as shown in Figure 11. The rip cord 77 is secured to a slotted tube 110, slidably disposed in a hollow operating plunger 111 which constitutes a movable feature of the barometric release mechanism 37. The tube 110 has an enlarged head or flange 112 against which the operating plunger of the barometric release moves in order to pull the rip cord 77 which is welded or otherwise secured to the tube 110. The manual operating part of the release mechanism may consist of a head or plunger 113 which is slidable in the passageway of the tube 110 and which abuts the end wall of the passageway 110 upon pulling the rip cord portions 77ᵃ. The latter extends for connection to a releasable hand engaging portion 120. The barometric release mechanism 37 may be armed by means of a control which takes the form of a rip cord 120ᵃ secured within a flexible housing 122. The latter is connected at 123 upon a panel or plate 124ᵃ secured to the wearer's harness. The housing 124 for the rip cord portion 77ᵃ may likewise be secured at 125 to plate 124ᵃ. The cord 120 may have a handle 140 pocketed in usual manner upon the harness.

It is possible to use any form of manual, barometric or time release mechanism, only the handle details of which are exposed externally of the pack at any desirable location upon the harness of the wearer.

Corner flaps such as shown at 127 may be provided for sealing the corners of the pack, if found necessary, and a similar flap 128 may be provided for the pack at the corner from which the rip cord housing extends to more fully protect details within the pack.

Referring to the form of pack A' shown in Figure 14, similar reference characters to those shown in the preferred form of pack above described indicate like parts, with the exception that a principal flap 30ᵃ may be provided with a duplicate release pin mechanism 130 constituting the same details as above described for the flap 30 in the form of invention shown in Figure 4. That is, duplicate release pin mechanisms may be provided, one upon each side of the pack, for releasing the flap 30ᵃ selectively. The fasteners may be operated by means of one or two rip cords, as desired. In this form of mechanism, a slide type fastener 141 is provided upon the principal panel 30 midway between the sides of the pack, to facilitate closing of the container, at the end of a packing operation.

The diagrammatic view Figure 12 shows that as soon as the principal flap 30 has been thrown open by elastic 61, the momentum imparted thereby to the pilot canopy enclosing flap 52 aided by a spring usually provided in the conventional pilot parachute, such as shown in U.S. Patent 2,299,408, cause the flap 52 to quicly unroll and eject the pilot parachute clear of other pack details for functioning as an anchor to extract the main parachute from the pack.

The slide fasteners 32 and 141 enable the containers to be closed at the end of a packing operation, since the other rip pin type fastener means is located entirely inside of the pack.

Referring to the parachute harness F, the same may vary in structure. It may consist of webbing 126 of any approved type secured as desired to the shroud lines of the main parachute canopy and to the pack, including a release coupling 135 and having on at least one web thereof the plate or re-enforcement 124ᵃ upon which the handles of the pack opening release mechanism are mounted. Such types of harnesses are those shown in U.S. Patents 2,482,693; 2,542,925; 2,016,236 and 1,560,-366.

The container inside wall at the top may be provided with a suitable compartment 150 for an oxygen bottle or any accessory desired.

Various changes in the size shape and arrangement of parts may be made to the form of invention herein shown and described, without departing from the spirit of the invention or scope of the claims.

What is claimed is:

1. A container for parachute packs comprising a foundation wall, margin flaps including opposed short flaps connected with the foundation wall, a principal closure flap, fastener means connecting a margin of the principal closure flap to one of said short flaps, a rip cord type operated fastener means releasably connecting the opposed margin of said principal flap to the opposite short flap, the last mentioned fastener means being disposed completely inside the container, and releasing means releasably connected to the last mentioned fastener means including an operating portion disposed externally of the pack.

2. A parachute pack container as described in claim 1 in which a canopy enfolding flap is connected with the principal flap at the marginal portion thereof adjacent to the inside fastener means, and means connected to the principal flap for forceful opening of the principal flap upon operation of the inside fastener means.

3. In a parachute pack construction the combination of a container comprising a foundation wall having a chamber therein with closure means for access thereto from within the inside of the container, opposed short closure flaps marginally connected with the foundation wall, a principal closure flap covering substantially the entire area of the foundation wall having fastener means at one margin for releasable connection with one of the short closure flaps, an internally facing rip cord actuated type fastener means connecting the opposite margin of the principal closure flap with the short closure flap opposite to the first mentioned fastener means, and release means connected to the internally facing fastener means including a barometric release mechanism disposed in the chamber of the foundation wall and having an operating connection externally of the container.

4. In a parachute pack container the combination of a container having a foundation wall having means thereon for receiving a canopy and shroud lines, and closure means for said container including a principal flap connected to the container and a second flap connected to the container, the principal flap at its free margin having transversely apertured fastener studs fixed thereon, the second flap having grommets therein for receiving said studs, rip pin means for the studs to hold the principal flap connected with the second flap, all of said studs, grommets and rip pin means being disposed and facing to the inside of the container, guard means mounted within the container enclosing said studs, cones and pin means, and release means connected with the rip pin means having an operating portion externally of the container.

5. In a parachute pack container the combination of a foundation wall having marginal flexible flaps connected therewith, a principal flap, fastener means for connecting a margin of the principal flap with one of the foundation wall flaps, said fastener means being located and faced entirely inwardly of the container, guard means for guarding said fastener means from adjacent parts of the pack, a pilot parachute enfolding flap connected with and movable with the principal flap and located thereon adjacent to the fastener means of the principal flap, and elastic means for forcefully throwing the principal flap open in a direction opposite to the fastener means.

6. In a parachute pack construction the combination of a container having a foundation wall and flexible closure flaps connected to and surrounding the foundation wall adapted to enclose a parachute canopy upon the foundation wall within the container, fastener means releasably connected to said closure flaps for releasably holding the closure means in parachute enclosing relation including a barometric release mechanism disposed completely inside of the container when closed and including a flexible operating cord extending to a location outside of the container.

7. In a parachute pack construction the combination of a container comprising a foundation wall, closure flaps surrounding the foundation wall for enclosing a parachute canopy in the container upon said foundation wall, one of said flaps being a principal closure flap, and another of said closure flaps opposite the principal closure flap having a fixed grommet therein, the principal closure flap at its free end having a transversely apertured stud fixed therewith and adapted to extend through the grommet to face the inside of the container, and rip cord means including a pin portion disposed within the container releasably extended through the transverse aperture of the stud for holding the said principal flap and its opposite flap in parachute canopy enclosing relation, said rip cord means having a portion extending to the outside of the pack for operation of the same.

8. A parachute pack construction as defined in claim 7 in which the rip cord means includes a barometric release mechanism including a casing bodily located inside of the container and having a flexible arming release means extending from the inside to the outside of the container and a manual release means connected to said barometric release mechanism casing for the manual release of the fastening means including an operating portion extending to the outside of the container.

9. In a parachute pack construction the combination of a container having a foundation wall and provided with marginally extending closure flaps, one of said closure flaps at its free margin being provided with fixed grommets and an opposite closure flap being provided with studs fixed thereto and faced and extended inwardly and provided with transverse openings therethrough within the container, said studs releasably extending inwardly of the pack and through the grommets, and rip type releasing means including pins extending through the transverse openings of said studs to hold said flaps in closed relation.

10. A parachute pack construction as defined in claim 9 in which releasable guard means is provided upon the flap which is provided with the grommets and housing the inner ends of said studs for the protection thereof against contact with interior parts of the pack and against accidental release of said pins from the studs.

11. In a safety type parachute pack adapted to be used in connection with jumps from high speed aircraft, the combination of a container having a base wall, flexible marginal closure flaps connected to the base wall including opposed closure flaps, the opposed flaps having connected therewith inter-engaging internal fastener parts fixedly connected upon the free margins of said opposed closure flaps and facing for said inter-engaging entirely to the inside of the pack container, rip cord means disposed within the pack container releasably connecting the inter-engaging fastener parts of the opposed closure flaps and having a rip cord operating portion extending to a location externally of the pack container, and a parachute canopy and shroud line assemblage stowed in the pack container.

12. A safety type parachute pack as defined in claim 11 in which a barometric release mechanism having connection with said rip cord means for operating the same is completely housed within said pack container.

13. A safety type parachute pack as defined in claim 11 in which a closure flap of the container has an opening therein provided with an externally operable fastener for closing and releasing said opening, the opening being used when the external fastener is unfastened to permit packing of the container.

References Cited in the file of this patent

UNITED STATES PATENTS

| | | |
|---|---|---|
| 2,495,341 | Moran | Jan. 24, 1950 |
| 2,519,923 | Noelcke | Apr. 22, 1950 |
| 2,542,925 | Irvin | Feb. 20, 1951 |
| 2,676,655 | Hatfield | Apr. 27, 1954 |
| 2,812,148 | Fogal et al. | Nov. 5, 1957 |

FOREIGN PATENTS

| | | |
|---|---|---|
| 420,059 | Great Britain | Nov. 23, 1934 |
| 580,029 | Great Britain | Aug. 23, 1946 |
| 1,099,529 | France | Mar. 23, 1955 |